United States Patent [19]

Hemming et al.

[11] 3,955,054

[45] May 4, 1976

[54] TELEPHONE HOUSING HAVING INTERCHANGEABLE DIAL FACE INSERTS

[75] Inventors: Raymond Charles Hemming, London; Quentin R. Ball, Westmount, both of Canada

[73] Assignee: Northern Electric Company, Limited, Montreal, Canada

[22] Filed: Nov. 13, 1974

[21] Appl. No.: 523,353

[52] U.S. Cl. .............................. 179/100 D; 179/179
[51] Int. Cl.² ...................... H04M 1/02; H04M 1/23
[58] Field of Search ....... 179/90 FW, 100 R, 100 D, 179/178, 179; D26/14 A; 40/336, 337

[56] References Cited
UNITED STATES PATENTS

| | | | |
|---|---|---|---|
| 2,808,668 | 10/1957 | Christin | 40/337 |
| 2,955,371 | 10/1960 | Brunner | 40/336 |
| 3,339,960 | 9/1967 | Gee | 179/178 |
| 3,345,769 | 10/1967 | Nathan | 179/178 |
| 3,480,743 | 11/1969 | Engh et al. | 179/100 D |
| 3,491,221 | 1/1970 | Zamarra | 179/178 |
| 3,838,229 | 9/1974 | Morrell et al. | 179/179 |

Primary Examiner—Kathleen H. Claffy
Assistant Examiner—Randall P. Myers
Attorney, Agent, or Firm—Sidney T. Jelly

[57] ABSTRACT

A telephone having an interchangeable dial face insert, the insert of transparent material having a shape which fits over an aperture in the dial face of the housing. There is a protrusion on one edge of the insert which enters a slot in the periphery of the aperture in the dial face, and a resilient clip on the periphery of the aperture in the dial face, at a position opposite the slot, the clip engaging over the edge of the insert. A further insert, having information and/or cosmetic patterns thereon, can be positioned beneath the transparent insert.

7 Claims, 8 Drawing Figures

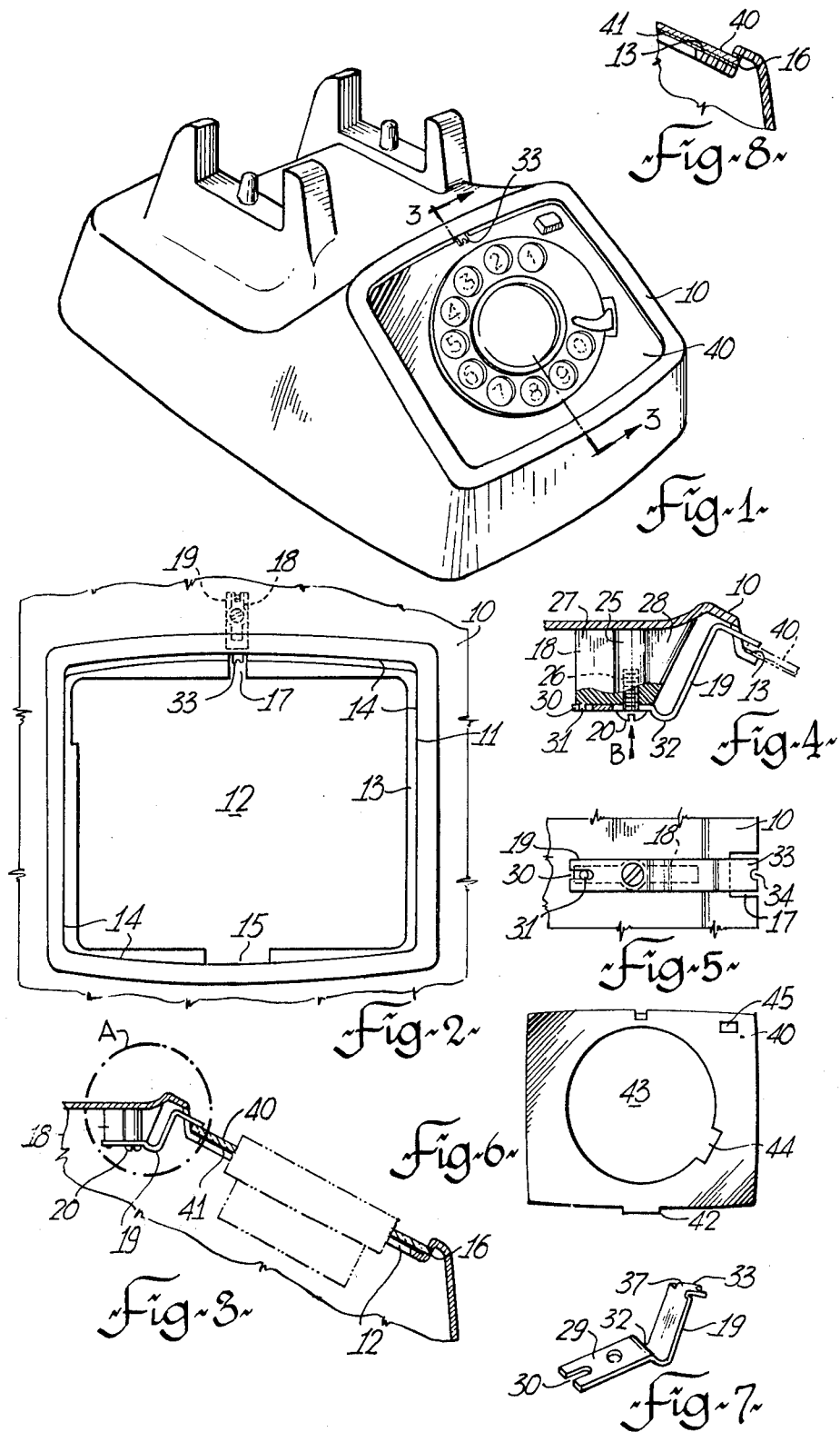

TELEPHONE HOUSING HAVING INTERCHANGEABLE DIAL FACE INSERTS

The invention relates to telephone housings having interchangeable dial face inserts. In particular the invention relates to interchangeable inserts which surround the dial of a telephone set.

By means of the present invention, it is possible to change the colour of the surround to the dial, to change the format of an indicator card under the surround, for example as used in extension telephones in hotels and the like. It is also possible to change the form of the surround, such as to provide for different forms of dial, and to allow for an indicator light. All these changes and variations are provided using the same form of telephone housing. Thus one housing only is stocked, variations being provided by a variety of interchangeable inserts for the dial surround.

Broadly the invention comprises an insert of transparent material having a shape adapted to fit over an aperture in the dial face of a telephone housing; an aperture formation for reception of the telephone dial; a protrusion on one edge of the insert for entry into a slot in the periphery of the aperture in the dial face; and a resilient clip on another edge of the aperture in the dial face, the clip engaging over an edge of the insert. In accordance with a feature of the invention a further insert of substantially the same shape as the first insert can be positioned beneath the first insert and be visible therethrough.

The invention will be readily understood by the following description of certain embodiments, by way of example, in conjunction with the accompanying drawings, in which:-

FIG. 1 is a perspective view of a telephone top housing;

FIG. 2 is a view on the dial face of the housing of FIG. 1, with dial and dial face insert removed;

FIG. 3 is a cross-section on the line 3—3 of FIG. 1;

FIG. 4 is an enlarged side view of the area within the circle A in FIG. 3;

FIG. 5 is a view in the direction of arrow B in FIG. 4;

FIG. 6 is a plan view of a typical insert;

FIG. 7 is a perspective view of the clip in FIGS. 3 and 4;

FIG. 8 is an enlarged cross-sectional view of the lower part of the insert and associated part of the housing.

Illustrated in FIGS. 1 and 2 is a top housing 10 of a telephone set. The housing has a dial face indicated generally at 11. The dial face 11 has an aperture 12 therein. As seen in FIG. 2, the aperture 12 is formed in a recessed portion of the dial face having a flat flange 13 around the aperture. In the example illustrated the aperture is substantially square and the surrounding peripheral parts 14 of the dial face are slightly convex for aesthetic reasons. At the bottom of the aperture 12, the flange 13 is cut away, at 15, and a slot 16 is formed in the bottom peripheral part 14 of the dial face at this same position, for reception of a protrusion on an insert, as will be described.

At the top of the dial face 11, the flange 13 is cut away to form a narrow slot 17 in the dial face, extending from the periphery of the aperture 12. Immediately behind this slot 17 is formed a boss 18 on the inside of the housing. A resilient clip 19 is mounted on the boss 19 and attached by a screw 20. The slot 17, resilient member 19 and boss 18 are seen more clearly in FIGS. 3, 4 and 5. The boss 18 has a central cylindrical portion 25, and has a bore 26 for reception of the screw 20, which is normally of self-tapping type. A narrow flange 27 extends rearwardly from portion 25 and a further narrow flange 28 extends forwardly from portion 25.

The clip 19, illustrated in more detail in FIG. 7, has a flat portion 29 which rests on top of the boss, over the central portion 25 and flanges 27 and 28. At the rear end of the clip is formed a slot 30 and a small knob or pip 31 is formed on the top surface of flange 27 to locate the clip by being positioned in the slot 30. The clip is bent up at 32 and has its upper end portion bent forward at 37. The end 33 extends into the narrow slot 17. The end portion 33 can have a small semicircular slot 34 formed in the extreme end, for a purpose to be described. There is a clearance between the clip 19 and the front edge of the clip rearwardly.

The slot 16 is seen more readily in FIG. 8. Also seen in FIG. 8 are top and bottom inserts 40 and 41. At the top, as seen in FIG. 4, it will be seen that the inserts 40 and 41 are held down by the end portion 33 of the clip 19. At the bottom, protrusions 42 on the bottom edges of the inserts 40 and 41 are inserted in the channel 16. The cut away portion is not essential but makes the formation of the slot 16 during molding of the housing 10 easy.

The shape of the insert is typified by FIG. 6. The inserts 40 or 41, are of a shape to fit on the recessed flange 13. A protrusion 42 is formed on the bottom edge and an aperture 43 is provided for a rotary dial. A cut out 44 is provided for the finger stop of a dial. For a pushbutton dial a number of small individual apertures are provided, one for each button. If desired a further aperture 45 can be provided for insertion of a coloured or other form of dome for a signal lamp in the telephone.

The top insert 40 can be transparent, being completely clear or translucent. It can be white or any desirable colour. A white clear top insert can be used with a coloured or patterned bottom insert. The bottom insert can serve as an indicator, having wording designating functions of the various dial numerals thereon, such as are used in hotel rooms. Only a top insert need be used, in which case it will normally be translucent. Conveniently the top insert 40 is plastic. The bottom insert can be of cardboard, or paper, or other material. Cloth material can be used if desired.

To remove an insert, the spring clip 19 is flexed upward so that the end portion 33 is clear of the insert. This is easily done by pushing on the extreme end of the portion 33 with a round tool - such as an unbent paper clip or other implement, conveniently located on the end by the groove 34. The insert is lifted at the top edge and then the protrusion 42 disengaged from the slot 16. An insert is inserted by first engaging the protrusion 42 in the slot 16, pushing back the clip 19, pushing down the insert and releasing the clip.

The invention enables inserts of varying colours to be used - to match decor etc. It is possible to use a bottom insert of material matching upholstery, curtains or wall coverings. A single form of housing can accept varying forms of dial by merely using differing forms of insert. The insert can quickly and easily be replaced and the telephone customer can make his or her own bottom inserts with a clear top insert.

What is claimed is:

1. A telephone housing including a dial face, said dial face recessed for a major portion thereof;

an aperture in said recessed portion said aperture adapted to receive one of a pushbutton dial and a rotary dial without consequential modification to said dial face;

a flat flange extending around the periphery of said aperture to the periphery of said recessed portion of said dial face;

a removable transparent insert positioned on said flange over said aperture, said insert having differing configurations in accordance with the type of dial employed, and having top and bottom edges;

a protrusion on the bottom edge of said insert, said protrusion extending in the direction of the plane of said insert;

a first gap in said flange at a bottom part thereof and a first slot in the periphery of the recessed portion of said dial face coincident with said first gap, said first gap and said first slot positioned to accept said protrusion on said transparent insert;

a further gap in said flange at a top part thereof and a further slot in the periphery of said recessed portion of said dial face coincident with said further gap;

a further removable insert substantially of the same configuration as said transparent insert, positioned beneath said transparent insert and visible therethrough;

a resilient clip attached to the interior of said housing adjacent to said further gap, said clip including an end portion extending through said further slot and overlying the edge of said transparent insert, the arrangement such that deflection of said clip will move said end portion out of overlying engagement with said transparent insert to permit said transparent insert, and said further insert, to be lifted at a position adjacent to said clip and moved to disengage said protrusion from said first slot.

2. A telephone housing as claimed in claim 1, said dial a rotary dial, and said aperture formation in said insert a circular aperture closely fitting said dial.

3. A telephone housing as claimed in claim 1, said dial a pushbutton dial, and said aperture formation in said insert comprising a series of apertures, an aperture for each pushbutton.

4. A telephone housing as claimed in claim 1, said second insert having a predetermined pattern of wording thereon.

5. A telephone housing as claimed in claim 1, said second insert having a pattern thereon.

6. A telephone housing as claimed in claim 1, said insert further including a second aperture for alignment with a signal lamp.

7. A telephone housing as claimed in claim 1, including a recess in the top surface of said insert, said end portion of said clip positioned in said recess.

* * * * *